US 6,614,727 B2

(12) United States Patent
McGuire

(10) Patent No.: US 6,614,727 B2
(45) Date of Patent: *Sep. 2, 2003

(54) THREE DIMENSIONAL CHILDREN'S SLEEPTIME TIMER AND CLOCK DEVICE

(76) Inventor: Patricia E. McGuire, 19 Stonehouse Dr., Whitehouse Station, NJ (US) 08889

( * ) Notice: Subject to any disclaimer, the term of this patent is extended or adjusted under 35 U.S.C. 154(b) by 220 days.

This patent is subject to a terminal disclaimer.

(21) Appl. No.: 09/804,568

(22) Filed: Mar. 12, 2001

(65) Prior Publication Data
US 2002/0126580 A1 Sep. 12, 2002

Related U.S. Application Data

(63) Continuation-in-part of application No. 09/711,255, filed on Nov. 13, 2000, now Pat. No. 6,361,325.

(51) Int. Cl.[7] .............................................. G09B 19/12
(52) U.S. Cl. ..................... 368/223; 368/229; 368/45; 368/71; 368/77; 434/304
(58) Field of Search ............................ 368/71, 77, 223, 368/229; 434/304; 446/147–152, 236–266

(56) References Cited

U.S. PATENT DOCUMENTS

| 3,747,330 | A |   | 7/1973  | Tupone .................... 368/221 |
| 3,763,648 | A | * | 10/1973 | Pakter et al. ............. 368/223 |
| 4,759,002 | A |   | 7/1988  | Cash ........................ 368/15  |
| 4,993,006 | A | * | 2/1991  | Oshima et al. ............ 368/223 |
| 5,044,961 | A |   | 9/1991  | Bruskewitz ............... 434/304 |
| 5,872,746 | A |   | 2/1999  | Reiner et al. ............. 368/223 |
| 6,361,325 | B1 | * | 3/2002 | McGuire .................... 368/71  |
| 6,392,963 | B1 | * | 5/2002 | McGinnis-Smith et al. . 368/107 |

* cited by examiner

Primary Examiner—David Martin
Assistant Examiner—Jeanne-Marguerite Goodwin
(74) Attorney, Agent, or Firm—Kennth P. Glynn, Esq.

(57) ABSTRACT

The present invention is a children's sleeptime timer and clock device. It includes (a) a housing adapted to contain and display at least one clock and to contain (b) at least one clock; and (c) a sleeptime display timer contained within the housing, which contains: (i) a moveable, three dimensional display having at least two three dimensional illustrations, wherein, when a first three dimensional illustration is openly displayed, at least a second three dimensional illustration is hidden from view, and when the second three dimensional illustration is openly displayed, at least the first three dimensional illustration is hidden from view, and wherein the first three dimensional illustration relates to a child's sleeptime; (ii) a step-up mechanism connected to the three dimensional display. The drive mechanism is adapted to maintain the display in a first position such that the first three dimensional illustration is hidden from view for a predetermined time during daytime and is adapted to move the three dimensional display to a second position to openly display the first three dimensional illustration to signal to a child that it is bedtime, and to return the first three dimensional illustration to a hidden position at a second predetermined time to signal that a child that it is time to be out of bed; (iii) timing means to operate the step-up device mechanism at the first and second predetermined times to move the three dimensional display; and (iv) setting means adapted to permit setting of the first and second predetermined times.

20 Claims, 6 Drawing Sheets

THREE DIMENSIONAL CHILDREN'S SLEEPTIME TIMER AND CLOCK DEVICE

REFERENCES TO RELATED APPLICATIONS

This patent application is a Continuation-in-Part of U.S. patent application Ser. No.09/711,255, filed on Nov. 13, 2000, now U.S. Pat. No. 6,361,325 entitled "Children's Sleeptime Timer and Clock Device", by the same inventor herein.

BACKGROUND OF THE INVENTION

1. Field of the Invention

The present invention is directed to a device for parents to make the transition from awake time to bedtime more efficient and reliable for young children. More specifically, it includes a clock and a timer wherein the timer causes movement of a three dimensional display for presentation of a sleeptime-related illustration at an appropriate time to motivate the child to go to bed in the evening. Likewise, the device also guides the child to stay in bed or rise in the morning, depending upon the three dimensional illustration presented.

2. Information Disclosure Statement

The following patents related to time pieces and other devices which involve activity timing, or the like:

U.S. Pat. No. 3,747,330 describes a time piece having animated motion resulting from an annular member mounted slidably around an eccentrically rotatable wheel, the eccentrically mounted wheel being mounted on a shaft rotatable by a time mechanism at a rate of one rotation per minute. In a preferred embodiment, there is a rotatable transparent disk concentrically mounted on a shaft and rotatable by the shaft at a rate of one rotation per minute, the transparent disk having thereon an animate-appearing object.

U.S. Pat. No. 4,759,002 describes a clock having a housing which contains two internal disks and a motor for rotation of those disks on a shaft. An hour disk is provided having a shaded region representing night and an unshaded region representing day. The hour disk is positioned to appear through an opening in the clock face. The face of the clock may have one or more openings to expose the minute and hour disks. One of the openings has a numerical representation of hours provided on the clock face there around. The clock is arranged so the line separating the dark and light regions of the hour disk indicates the hour of day by pointing to a number on the face, and also graphically represents the amount of time from and to the previous and next sunrise or sunset.

U.S. Pat. No. 5,044,961 describes a timer for teaching young children the concept of time. The timer includes a timing mechanism contained within a housing having a timer dial and activity selector. The timer dial permits selection of a duration of predetermined length and includes an indicator which moves in relation to a time scale to graphically illustrate the change in duration of length. The activity selector permits display of a graphic representation of the activity being timed or for which the child is waiting.

U.S. Pat. No. 5,872,746 describes, a clock timer. A clock timer having a face compromising a mouth, eyes, a nose, and an arm secured to the nose. Rotation of the nose turns the shaft which, via a camming mechanism, forces a plate housed within the clock upward. As the plate moves upward, a rack formed in the plate drives a gear mechanism which rotates the mouth and eyes from a smiling orientation to a frowning orientation. Rotation of the shaft also rotates a timer housed within the clock. Upon expiration of the timer the shaft is rotated in the opposite direction, thereby lowering the plate, driving the gear mechanism, and rotating the mouth and eyes from their frowning orientation to their smiling orientation, and activating a bell housed in the timer.

Notwithstanding the prior art, the present invention is neither taught nor rendered obvious thereby.

SUMMARY OF THE INVENTION

The present invention is a children's sleeptime timer and clock device, it includes: (a) a housing adapted to contain and display at least one clock and to contain (b) at least one clock; and, (c) a sleeptime display timer contained within the housing, which contains: (i) a movable, three dimensional display having at least two three dimensional illustrations wherein, when a first three dimensional illustration is openly displayed, at least a second three dimensional illustration is hidden from view, and, when the second three dimensional illustration is openly displayed, at least the first three dimensional illustration is hidden from view, and wherein the first three dimensional illustration relates to a child's sleeptime; (ii) a step-up drive mechanism connected to the three dimensional display. The drive mechanism is adapted to maintain the display in a first position such that the first three dimensional illustration is hidden from view for a predetermined time during daytime and is adapted to move said three dimensional display to a second position to openly display the first three dimensional illustration to signal to a child that it is bedtime, and to return the first three dimensional illustration to a hidden position at a second predetermined time to signal to a child that it is time to be out of bed; (iii) timing means to operate the step-up device mechanism at the first and second predetermined times to move the three dimensional display; and, (iv) setting means adapted to permit setting of the first and second predetermined times.

By "display" is meant any combination of illustrations in a present invention device, as well as the movable parts which expose and conceal the illustrations, including, but not limited to, platforms, discs, wheels, stages, doors, door openings and axles for rotation. By "step-up drive mechanism" as used herein is meant a motor drive that turns on and off in response to signals to drive the three dimensional display from one position to another position. It is not a continuous drive mechanism and the display of the present invention is not intended to move continuously. In preferred embodiments, the three dimensional display is a rotatable display wheel.

In the present invention children's sleeptime timer and clock device either an analog or a digital clock, or both may be employed. The timing means of the sleeptime display timer may include a programmable chip and the setting means may be an input pad. Alternatively, other setting means may be employed in the present invention device. For example, the type of timers used to turn lights on and off may be employed. Thus, the timing means may be a set of manually rotatable on/off bars located about a rotating clock mechanism for setting and triggering the timer.

The present invention children's sleeptime timer and clock device housing should include means for concealing one illustration while exposing the other and vice versa. For example, the housing may include sliding door(s) or it may include a half circle opening for display of a portion of a display wheel, or some other appropriate shape. In one preferred embodiment, the display wheel is divided into two halves and contains the first three dimensional illustration on a first half and contains the second three dimensional illustration on a second half. The display may move in a horizontal plane, a vertical plane, or any other plane. In some embodiments, the display may have three or more illustrations. For example, there may be a number of illustrations on the display and the three dimensional illustrations may be located on equal or unequal pie shaped areas of a display wheel. Here, the housing may include a pie shaped open area at least equal to the pie shaped areas, with the remaining illustrations concealed.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Dr. Richard Ferber, Director of the Center for Pediatric Sleep Disorders at Children's Hospital in Boston, Mass., emphasizes the importance of bedtime routines for children. He notes that, as a baby grows into childhood, the routines at bedtime continue to be important. If bedtime is a pleasant time, a child will look forward to this part of the day instead of becoming fussy when it is time for sleep. Bedtime rituals differ, of course, and parents should choose a routine that suits the family, but should make sure enough time is allocated to spend with the child each night. Following the routine as consistently as one can is extremely important. The child should know when he has to change into his pajamas, brush his teeth, and go to bed. He should know what bedtime activities are planned and how much time will be spent on them.

Bedtime means separation, which is difficult for children, especially very young ones. Simply sending a toddler or young child off to bed alone is not appropriate or fair and may be scary for him. And it means that the parent will miss what can be one of the best times of the day. So Dr. Ferber suggests that parents set said aside ten to thirty minutes to do something special with their child before bed. Avoid teasing, scary stories, or anything that will excite the child at this time. He recommends utilizing pre-bedtime for discussion, quiet play, or story reading, and then letting the child know that the special time together will not extend beyond the time set for lights out, and not to give in for an extra story. The child will learn the rules only if the parent enforces them. If both the parent and the child know just what is going to happen, there won't be the arguments and tension that would otherwise arise when there is uncertainty. The present invention is directed to further assist parents by enabling them to make a smooth, consistent transition from awake time to bedtime. It also aids in keeping a child in bed when the child wakes up early and to visually inform the child that its time to be up. This is accomplished in the present invention by using three dimensional illustrations actually showing the child sleeping or waking activity, at the appropriate times.

Figure 1:
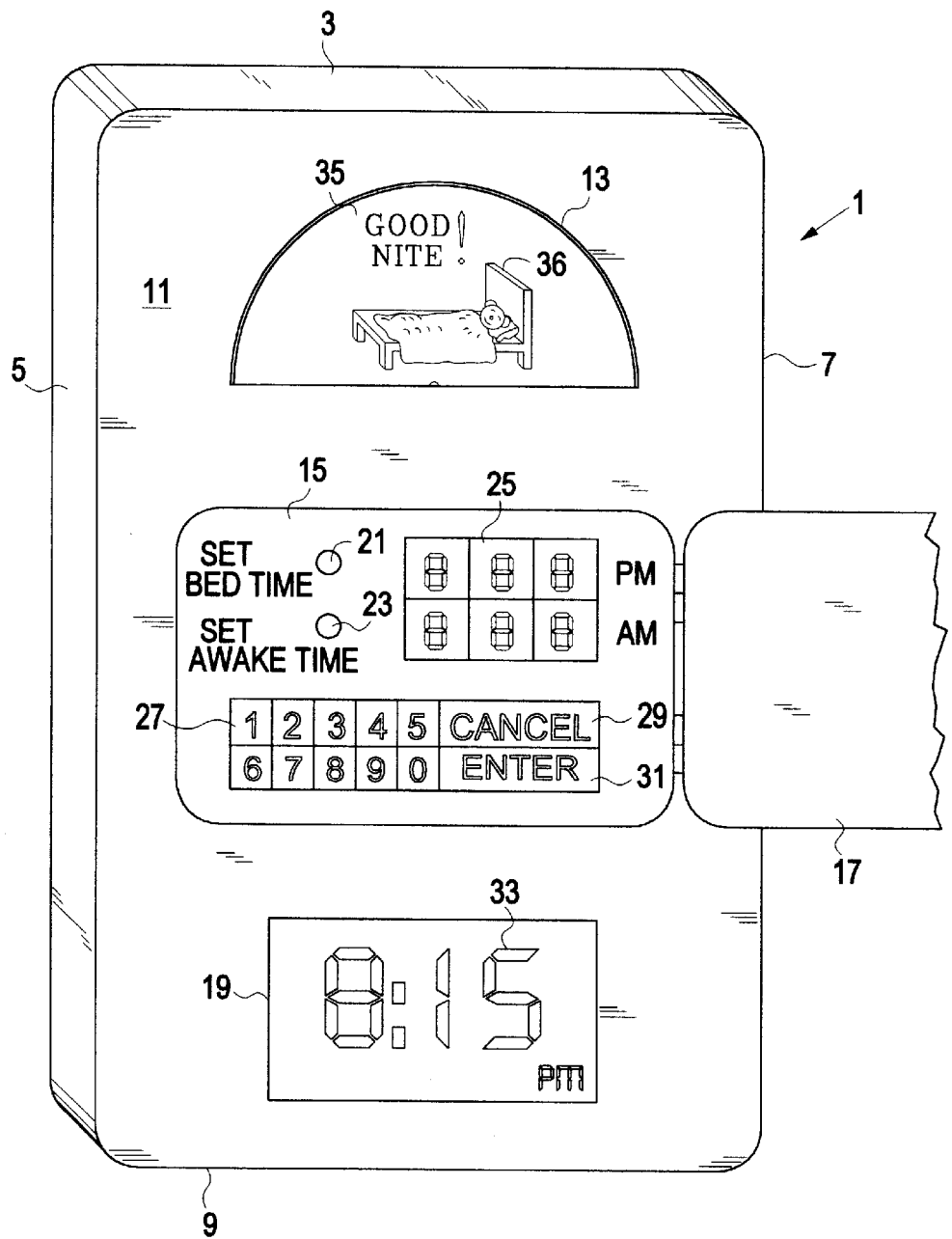
FIG. 1 illustrates a front perspective view of one embodiment of the present invention children's sleeptime timer and clock device, wherein an electronic timer is included.

Referring now to FIG. 1, there is shown a present invention device 1 which includes a top 3, a left side 5, a right side 7, a bottom 9, a front 11, and a back not shown. Front 11, includes a window 13 which presents a three dimensional display wheel 35. Three dimensional display wheel 35 is a half circle with a three dimensional illustration 36 showing a sleeptime scene and it includes a lower half with a different, second three dimensional illustration showing an awake scene (hidden). Electronic timer 15 is used to set the bedtime and the awake time using set buttons 21 and 23, respectively, and then using keypad 27. For example, a user could press button 21 for setting bedtime, enter 800 into keypad 27, press enter button 31 and 8:00 P.M. will appear on display 25. Next, the user can press button 23 for setting the awake time and then, for example, entering 730 into keypad 27 and pressing enter 31 button. The lower numerals on display 25 will appear as 7:30 A.M. Thus timer 15 drives a step-up mechanism which, through motor drive and gearing, rotates the display wheel ½ turn at the present bedtime and again at the reset awake time to visually inform the child that he or she should be asleep or up and around. The timer also includes a chip for receiving, storing and activating the timing data and signals. Door 17 may then be closed and may optionally include a decorative illustration. Digital clock 19 will display time 33 to enable a parent to teach time to the child. Digital clock 19 may be connected to the timer 15 for synchronization or may operate separately. The device may be operated by house current, battery or otherwise. The foregoing could alternatively be modified to accommodate a plurality of sleeptime and awake time inputs for a single 24 hour cycle. For example, with the three dimensional display wheel 35 having only two illustrations, such a modified device could be programmed to accommodate two or three sets of sleep and awake cycles, thereby accommodating one or two naps in addition to nighttime sleep.

Figure 2:
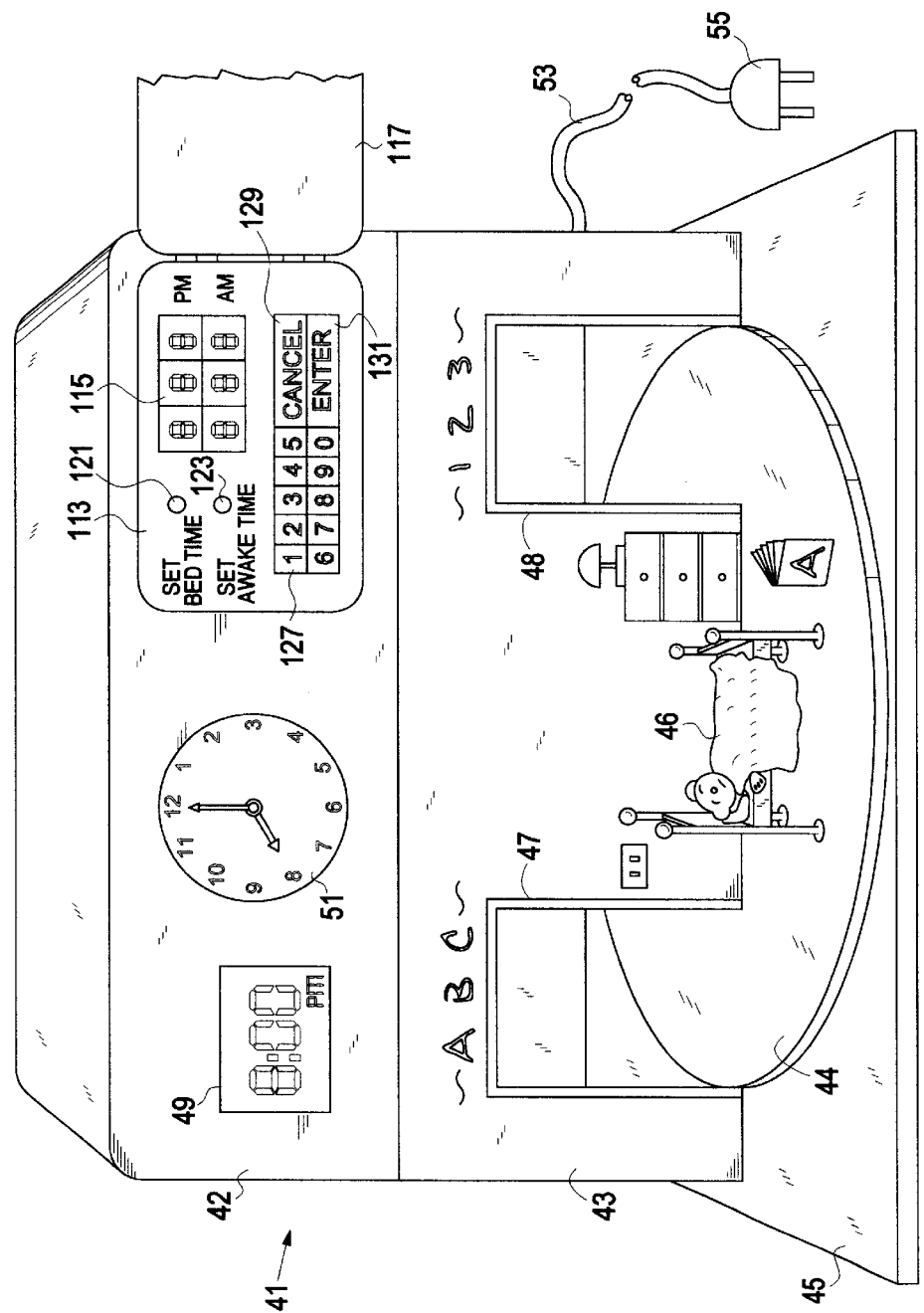
FIG. 2 illustrates a front perspective view of another embodiment of the present invention children's sleeptime timer and clock device containing both a digital and an analog clock.

FIG. 2 illustrates another embodiment of a children's sleeptime timer and clock device of the present invention. Here, device 41 has a main housing with an upper section 42 and a lower section 43. Lower section 43 includes doors 47 and 48 for displaying a first illustration 46 or a second illustration (not shown) of display wheel 44, depending on which half is positioned in the front 45. When first three dimensional illustration 46 is shown, the second three dimensional illustration is hidden or concealed in the back. By 180 degrees rotation of display wheel 44 the sleeptime three dimensional (first) illustration 46 is rotated to concealment, and a second illustration of an awake time scene comes forward to exposure. They are sized to pass in and out of doors 47 and 48.

Clock 49 is a digital clock and clock 51 is an analog clock. These enable a parent to teach children time on both types of clocks, as well as to relate bedtime and awake time to a specific time. Device 41 may be operated by house current with cord 53 and plug 55. The timing may be set for the step-up.

Figure 3:
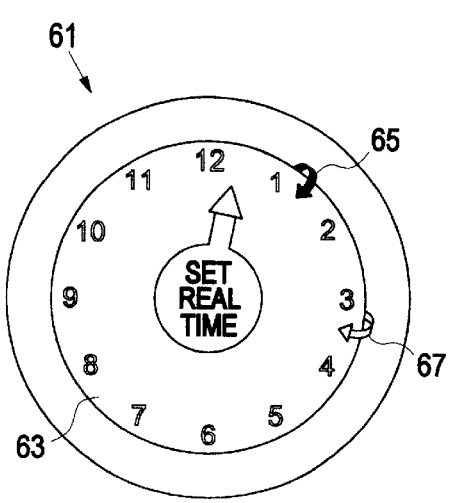
FIG. 3 illustrates an alternative timer mechanism which may be used in the present invention devices.

The timing is set by a timer 113 for device 41 and although shown in front, this may be located in the back or on the side of device 41 and could be similar to timer 15 of FIG. 1. Electronic timer 113 is used to set the bedtime and the awake time. The set bedtime button 121 and set awake time button 123 are used respectively, for the settings, which will show as set times display 115. For example, a user could press button 121 for setting bedtime, enter 7:30 P.M. into keypad 127, press enter button 131 and 7:30 P.M. will appear on the top of display 115. Next, the user may press button 123 for setting the awake time and then, for example, entering 8:00 A.M. into keypad 127 and pressing enter 131 button. The lower numerals on display 115 will appear as 8:00 A.M. The timer 113 will drive a step-up mechanism which, through motor drive and gearing, will rotate the display wheel 44 one half turn at the preset bedtime and again at the preset awake time to visually inform the child that he or she should be asleep or up and around. The timer may also include a chip for receiving, storing and activating the timing data and signals. Door 117 may then be closed and may optionally include a decorative illustration or child friendly words. As an alternative to the type of times illustrated above, the type of timer used on lighting, such as timer 61 shown in FIG. 3 could be used. In this case, clock disk 63 is used to locate time by rotation of dark arrow 65 and light arrow 67 wherein the user simply positions the arrows at the desired times for rotation of the display wheel, using arrow 65 for sleeptime illustration display and arrow 67 for awake time illustration display.

Figure 4:
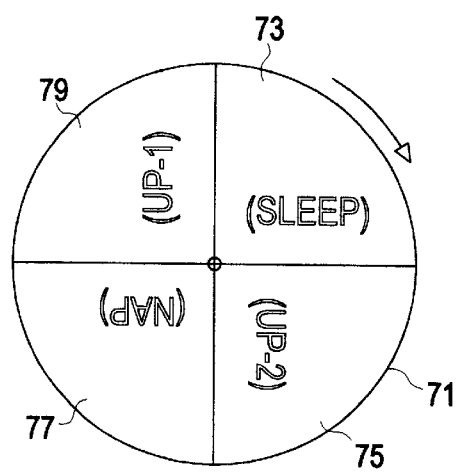
FIG. 4 illustrates an alternative embodiment display wheel which may be used in the present invention devices.

FIG. 4 shows an alternative embodiment display wheel 71 using four quadrants. The words in parenthesis in quadrants 73, 75, 77 and 79 would actually be four different three dimensional illustrations. This wheel 71 could be used in a device having a main housing with a pie-shaped window or open area to display only one quadrant at a time. Also, although the quadrants are equal in size, they generally would not be displayed for equal periods of time. For example, the sleep quadrant 73 could be present to "appear" at 7:00 P.M., the up-1 quadrant 75 at 7:30 A.M., the nap quadrant 77 at 1:30 P.M. and the up-2 quadrant 79 at 3:30 P.M. Other combinations could be used and yet be within the scope of the present invention.

Figure 6:
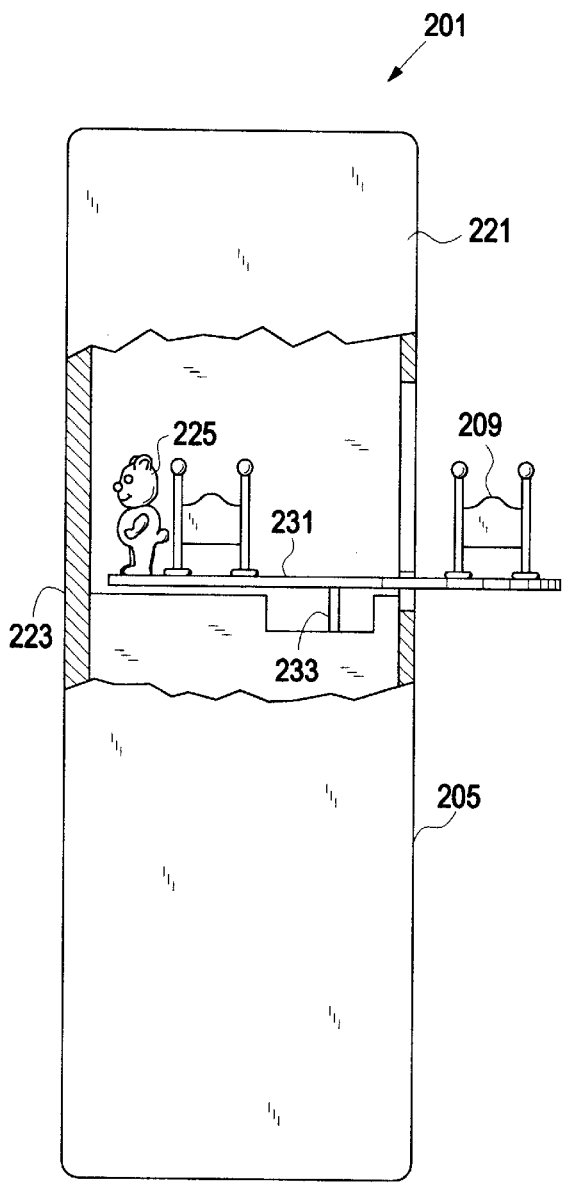
FIGS. 5 and 6 show a front and side view of a horizontally rotating display of a present invention device, respectively.
Figure 5:
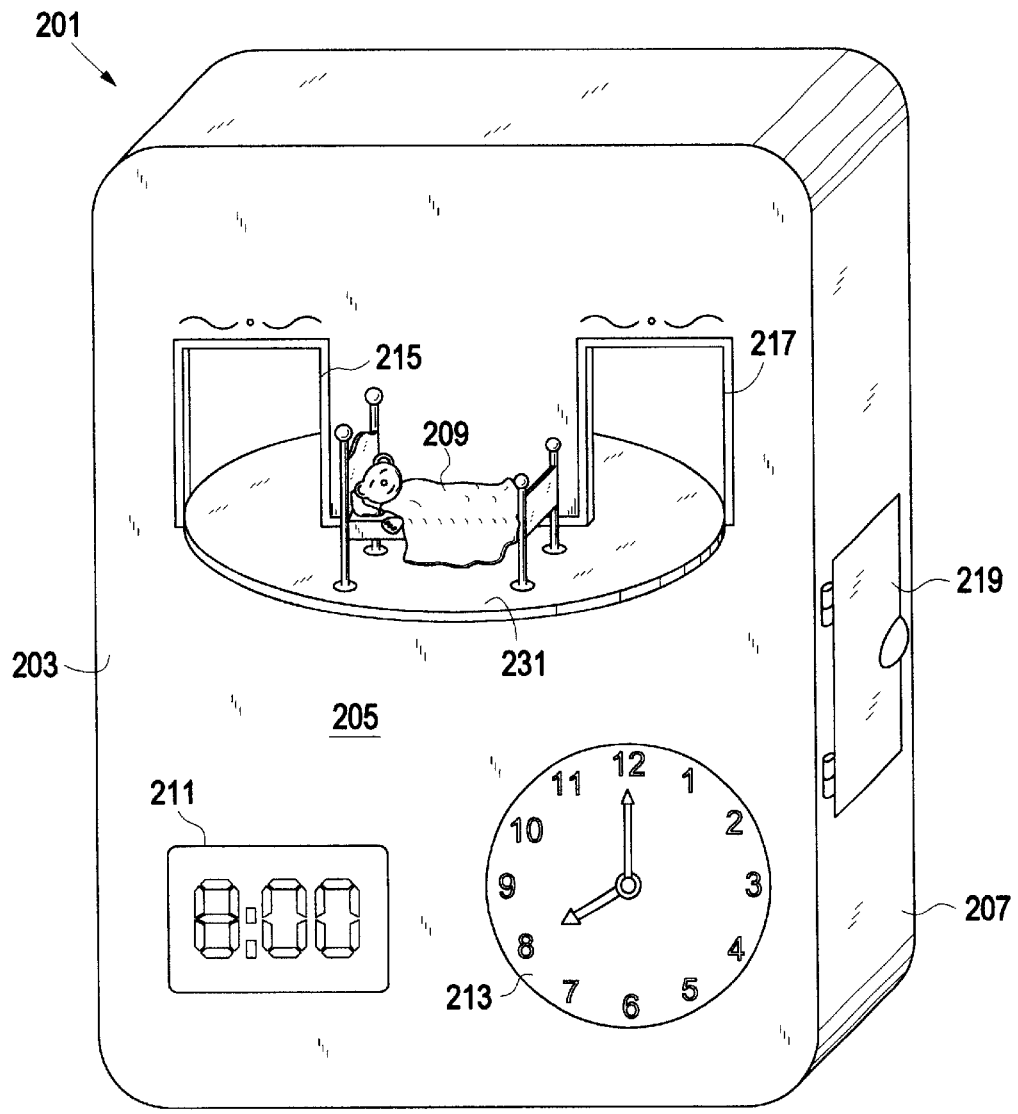

FIG. 5 shows a front perspective view and FIG. 6 shows a partially cut side view of a present invention device utilizing a horizontally rotating display. In both FIGS. 5 and 6, identical components are identically numbered.

Referring to both FIGS. 5 and 6, device 201 is shown having a main housing 203, with a front 205, a back 223 and sides 207 and 221. Horizontally rotating disk 231 rotates about axle 233 driven by a step-up drive motor 235 which is connected to a timer (not shown), similar to those described above which may be contained within main housing 203 and may be accessed for settings and adjustments at door 219. There is a digital clock 211 and an analog clock 213 which operate similarly to that shown in FIG. 2, except this embodiment includes a wall mounting recess 237, instead of a table arrangement as in FIG. 2. Additionally, this is battery operated instead of AC operated and has a battery compartment 239 instead of a plug.

Rotating disk 231 contains a first three dimensional illustration 209 and a second three dimensional illustration 225, relating to sleeping and awake activities, respectively. When one illustration is outside of the housing, the other is concealed behind wall 241. At the preset time, rotating disk 231 will rotate, for example, clockwise, 180 degrees and expose the previously hidden three dimensional illustration.

Figure 7:
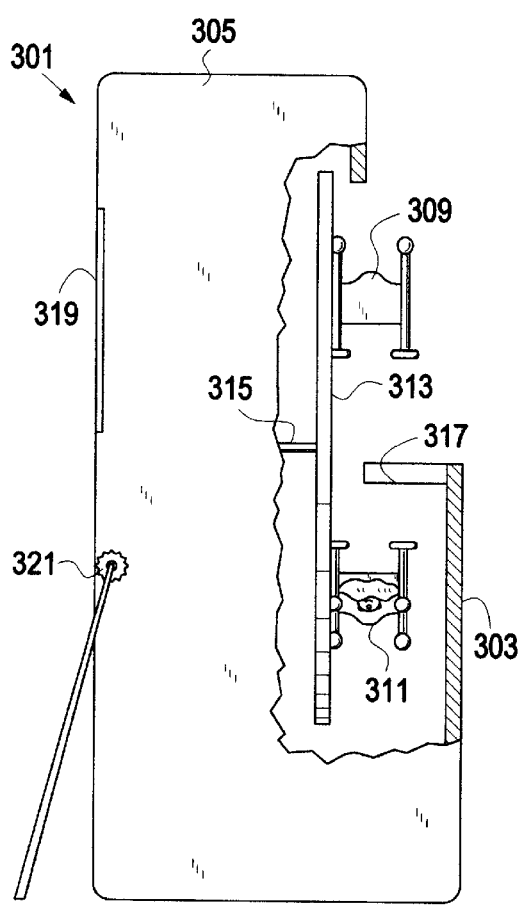
FIG. 7 shows a side view of yet another present invention embodiment.
Figure 8:
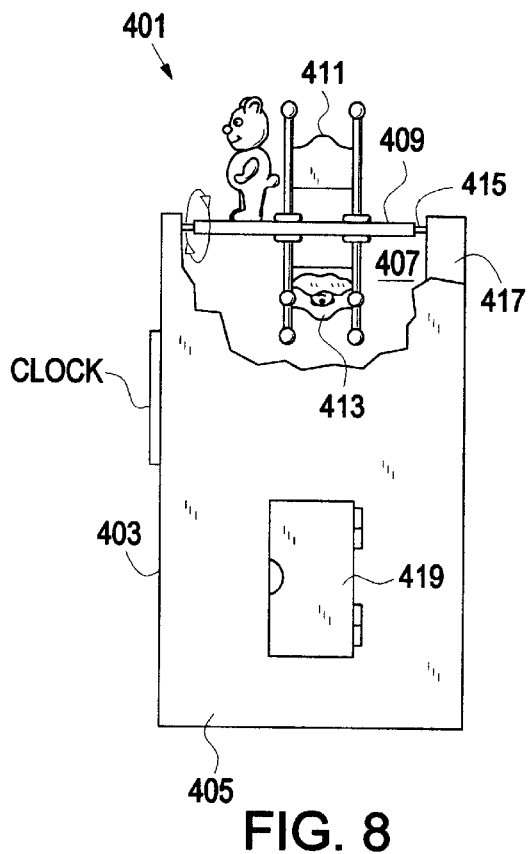
FIG. 8 shows a right side up, upside down rotating stage.

FIGS. 7 and 8 show side cut views of two more alternative embodiment present invention devices. In FIG. 7, present invention device 301 has a main housing 305 with a front 303 and an opening 325. A clock and timer and drive mechanism are included as described above, but are not illustrated. Vertically mounted display wheel 313 contains a first illustration 309, being a sleeptime illustration, and a second illustration 311, being an awake illustration. These illustrations 309 and 311 are opposite one another and display wheel 313 rotates about horizontal axis 315 when a step-up drive mechanism is activated by a preset timer to move display wheel 313 180 degrees. Back 323 includes an axis door 319 for settings and adjustments and includes an adjustable angle "kickstand" for vertical or tilted positioning. Somewhat flexible bristles 317 are included to block the view of the concealed illustration.

FIG. 8 shows present invention device 401 with housing 405 and clock 402 located in front 403. Setting axis to a 419 is provided and the settings and drive mechanism work similarly to those described above. There is a stage 409 which has an upper illustration 411 atop stage 409 and illustration 413 on its bottom. Stage 409 is a flat surface which has a rotational axis through its center and thus may be rotated to flip over at a preset time by axle 415 and drive gears 417 to expose illustration 413 and conceal illustration 411.

Figure 9:
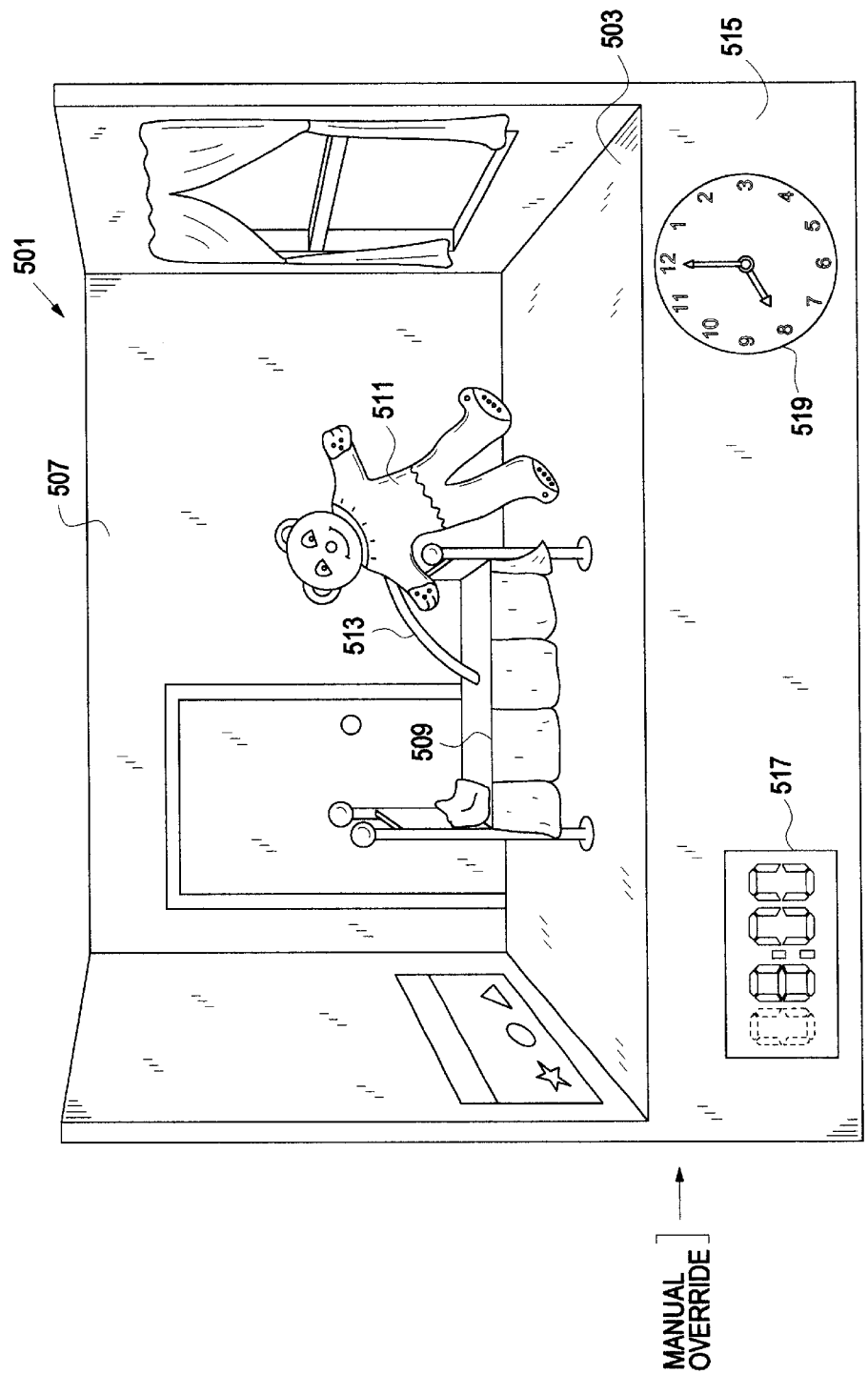
FIG. 9 shows a present invention device with two three dimensional illustrations using a single scene.

FIG. 9 shows a present invention with a different type of display. Present invention device 501 includes a stationary stage 503 with a bed 509 and digital and analog clocks 517 and 519 the settings and mechanism operate in a fashion similar to what is set forth above, except that instead of an entire scene being moved, two separate three dimensional illustrations are created by movement of a single object. In this case, bear 511 is connected to push rod 513 and a drive mechanism with a crank moves bear 511 from a sleeping position to a standing position and vice versa, at preset times to illustrate sleeping and awake activities.

Obviously, numerous modifications and variations of the present invention are possible in light of the above teachings. For example, the present invention may include a sleeptime illustration behind a first door and an awake illustration behind a second door. One door will open and the other close, or a door may shuttle back and forth to close off one illustration and open another. As another example, illumination may be included on one or more illustrations or particular features of illustrations. Also, sounds may be included, such as chimes or appropriate jingles. These would be included within the scope of the present invention. It is therefore understood that within the scope of the appended claims, the invention may be practiced otherwise than as specifically described herein.

What is claimed is:

1. A children's sleeptime timer and clock device, which comprises:
    (a) a housing adapted to contain and display a digital clock, an analog clock and to contain a sleeptime display timer;
    (b) the digital clock contained within said housing to digitally display at least hours and minutes;
    (c) the analog clock contained within said housing to digitally display at least an hour hand and a minutes hand;
    (d) the sleeptime display timer contained within said housing, which contains:
        (i) a movable, three dimensional display having at least two three dimensional illustrations wherein when a first three dimensional illustration is openly displayed, at least a second three dimensional illustration is hidden from view, and when said second three dimensional illustration is openly displayed, at least said first three dimensional illustration is hidden from view, and wherein said first illustration relates to a child's sleeptime;

(ii) a step-up drive mechanism connected to said three dimensional display and adapted to maintain said three dimensional display in a first position such that said first three dimensional illustration is hidden from view for a predetermined time during daytime and is adapted to move said display to a second position to openly display said first three dimensional illustration to signal to a child that it is bedtime, and to return said first three dimensional illustration to a hidden position at a second predetermined time to signal to a child that it is time to be out of bed;

(iii) timing means to operate said step-up drive mechanism at said first and second predetermined times to move said display; and, (iv) setting means adapted to permit setting of said first and second predetermined times.

2. The children's sleeptime timer and clock device of claim 1 wherein said timing means of said sleeptime display timer includes a programmable chip and said setting means is an input pad.

3. The children's sleeptime timer and clock device of claim 1 wherein said display is a three dimensional display wheel, said timing means is a rotating clock mechanism and said setting means is a set of manually rotatable switch bars located about said clock mechanism for setting and triggering said timer.

4. The children's sleeptime timer and clock device of claim 3 wherein said display wheel is divided into two halves and contains said first three dimensional illustration on a first half and contains said second three dimensional illustration on a second half.

5. The children's sleeptime timer and clock device of claim 3 wherein there are a number of illustrations on said display wheel and said illustrations are located on equal pie shaped areas of said display wheel.

6. The children's sleeptime timer and clock device of claim 7 wherein said housing includes a pie shaped opening at least equal to said pie shaped areas.

7. The children's sleeptime timer and clock device of claim 1 wherein said housing includes an opening for display of a portion of said display wheel.

8. The children's sleeptime timer and clock device of claim 1 wherein there are at least three, three dimensional illustrations on said display, and at least one illustration relates to a non-sleeptime child's event.

9. The children's sleeptime timer and clock device of claim 1 wherein said display includes a rotatable stage and said first three dimensional illustration and said second three dimensional illustration are on opposite sides thereof.

10. The children's sleeptime timer and clock device of claim 9 wherein said timing means of said sleeptime display timer includes a programmable chip and said setting means is an input pad.

11. A children's sleeptime timer and clock device, which comprises:

(a) a housing adapted to contain and display at least one clock, and to contain a sleeptime display timer;

(b) the clock contained within said housing to display at least hours and minutes;

(c) the sleeptime display timer contained within said housing, which contains:

(i) a movable, three dimensional display having at least two three dimensional illustrations wherein when a first three dimensional illustration is openly displayed, at least a second three dimensional illustration is not openly displayed, and when said second three dimensional illustration is openly displayed, at least said first three dimensional illustration is not openly displayed, and wherein said first illustration relates to a child's sleeptime;

(ii) a step-up drive mechanism connected to said display and adapted to maintain said display in a first position such that said first illustration is not openly displayed for a predetermined time during daytime and is adapted to move said display to a second position to openly display said first illustration to signal to a child that it is bedtime, and to return said first illustration to an undisplayed position at a second predetermined time to signal to a child that it is time to be out of bed;

(iii) timing means to operate said step-up drive mechanism at said first and second predetermined times to move said display; and, (iv) setting means adapted to permit setting of said first and second predetermined times.

12. The children's sleeptime timer and clock device of claim 11 wherein said timing means of said sleeptime display timer includes a programmable chip and said setting means is an input pad.

13. The children's sleeptime timer and clock device of claim 11 wherein said display is a three dimensional display wheel, said timing means is a rotating clock mechanism and said setting means is a set of manually rotatable switch bars located about said clock mechanism for setting and triggering said timer.

14. The children's sleeptime timer and clock device of claim 13 wherein said display wheel is divided into two halves and contains said first three dimensional illustration on a first half and contains said second three dimensional illustration on a second half.

15. The children's sleeptime timer and clock device of claim 13 wherein there are a number of illustrations on said display wheel and said illustrations are located on equal pie shaped areas of said display wheel.

16. The children's sleeptime timer and clock device of claim 15 wherein said housing includes a pie shaped opening at least equal to said pie shaped areas.

17. The children's sleeptime timer and clock device of claim 11 wherein said housing includes a half circle opening of for display of a portion of said display wheel.

18. The children's sleeptime timer and clock device of claim 11 wherein there are at least three, three dimensional illustrations on said display, and at least one illustration relates to a non-sleeptime child's event.

19. The children's sleeptime timer and clock device of claim 11 wherein said display includes a rotatable stage and said first three dimensional illustration and said second three dimensional illustration are on opposite sides thereof.

20. The children's sleeptime timer and clock device of claim 11 wherein said at least one clock is selected from the group consisting of an analog clock, a digital clock, and combinations thereof.

* * * * *